U S009282555B2

United States Patent
Wang

(10) Patent No.: US 9,282,555 B2
(45) Date of Patent: Mar. 8, 2016

(54) RESOURCE CONTROL METHOD, DEVICE AND BASE STATION

(75) Inventor: Change Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 141 days.

(21) Appl. No.: 13/643,122

(22) PCT Filed: Apr. 18, 2011

(86) PCT No.: PCT/CN2011/072942
§ 371 (c)(1),
(2), (4) Date: Oct. 24, 2012

(87) PCT Pub. No.: WO2012/009991
PCT Pub. Date: Jan. 26, 2012

(65) Prior Publication Data
US 2013/0142135 A1 Jun. 6, 2013

(30) Foreign Application Priority Data
Jul. 21, 2010 (CN) .......................... 2010 1 0234937

(51) Int. Cl.
*H04W 4/00* (2009.01)
*H04W 72/04* (2009.01)
*H04W 28/20* (2009.01)
*H04W 88/10* (2009.01)
*H04W 92/04* (2009.01)
*H04W 28/08* (2009.01)

(52) U.S. Cl.
CPC .......... *H04W 72/0433* (2013.01); *H04W 28/20* (2013.01); *H04W 28/08* (2013.01); *H04W 88/10* (2013.01); *H04W 92/045* (2013.01)

(58) Field of Classification Search
None
See application file for complete search history.

(56) References Cited

U.S. PATENT DOCUMENTS

| 2003/0003909 A1* | 1/2003 | Keronen et al. ................ 455/434 |
| 2008/0080399 A1* | 4/2008 | Wang et al. .................... 370/254 |
| 2008/0279144 A1* | 11/2008 | Kikuchi ........................ 370/329 |
| 2008/0317067 A1 | 12/2008 | Saigo |

(Continued)

FOREIGN PATENT DOCUMENTS

| CN | 1867120 A | 11/2006 |
| CN | 1964275 A | 5/2007 |

(Continued)

OTHER PUBLICATIONS

International Search Report dated Jul. 28, 2011 of PCT/CN2011/072942.

*Primary Examiner* — Ian N Moore
*Assistant Examiner* — Phong La
(74) *Attorney, Agent, or Firm* — Banner & Witcoff, Ltd.

(57) ABSTRACT

A resource control method and device are provided in the present invention. The method includes: a base station collecting in real time an S1 transmission bandwidth occupied by one or more operators in the base station; and, when a user equipment (UE) initiates a service request, according to the remaining S1 transmission bandwidth of the operator to which the UE belongs, the base station determining whether the UE is allowed to access to the service or not. By collecting in real time the S1 transmission bandwidth resource occupied by each operator in the system, the present invention realizes resource control, ensures each operator's profit, avoids the case that the quality of service of the users of other operators is damaged or can not be accepted since one operator occupies excessive S1 transmission resource, thus guaranteeing user experience and enhancing user satisfaction.

7 Claims, 2 Drawing Sheets

(56) References Cited

U.S. PATENT DOCUMENTS

| | | | |
|---|---|---|---|
| 2010/0149971 A1* | 6/2010 | Noriega | 370/230 |
| 2011/0280127 A1* | 11/2011 | Raaf et al. | 370/230 |
| 2012/0134268 A1* | 5/2012 | Lopez et al. | 370/232 |
| 2013/0021962 A1* | 1/2013 | Hu et al. | 370/315 |

FOREIGN PATENT DOCUMENTS

| | | | | |
|---|---|---|---|---|
| CN | 101111070 A | 1/2008 | | |
| CN | 101505505 A | 8/2009 | | |
| EP | 2106179 A1 * | 9/2009 | | H04W 28/16 |
| JP | 2008-283322 A | 11/2008 | | |

* cited by examiner

RESOURCE CONTROL METHOD, DEVICE AND BASE STATION

TECHNICAL FIELD

The present invention relates to wireless communication systems, and more especially, to a resource control method, device and base station in the LTE (Long Term Evolution) system.

BACKGROUND OF THE RELATED ART

The LTE mobile communication system mainly comprises: a core network (CN), an evolved universal terrestrial radio access network (E_UTRAN) and user equipments (UE), the core network mainly comprises a Mobility Management Entity (MME) and a Serving Gateway (S-GW), the E_UTRAN is composed of an evolved Node B (eNB, or referred to a base station, which is a node in the long term evolution system), the CN and the E_UTRAN are interconnected through an S1 interface (the interface between the CN and the E_UTRAN), and different eNBs within the E_UTRAN are interconnected through an X2 interface, as shown in FIG. 1.

The S1 transmission bandwidth is related to the transmission medium and is limited, it is a valuable network transmission resource and is also one of the important resources concerned by the operators. Currently, there is a phenomenon in the communication system that multiple operators shares the same base station, such as the base station covering the subway, whose network is established by the subway corporation and various operators share the network resources. When the S1 transmission bandwidth occupied by an operator is too large, the quality of service of other operators cannot be guaranteed, which might lead to that the services cannot be accepted, thus affecting the user experience.

SUMMARY OF THE INVENTION

The purpose of the present invention is to provide a resource control method, device and base station to avoid that the quality of service of users of other operators is damaged because one operator occupies excessive S1 transmission resource.

To solve the aforementioned technical problem, the present invention provides a resource control method, comprising:

a base station collecting in real time an S1 transmission bandwidth occupied by one or more operators therein; and when a user equipment (UE) initiates a service request, the base station determining whether the UE is allowed to access the service or not according to the remaining S1 transmission bandwidth of the operator to which the UE belongs.

Preferably, the step of the base station collecting in real time the S1 transmission bandwidth occupied by one or more operators therein comprises: the base station collecting in real time the S1 transmission bandwidth occupied by each operator according to the ongoing services of one or more operators in the base station.

Preferably, the step of the base station determining whether the UE is allowed to access the service or not according to the remaining S1 transmission bandwidth of the operator to which the UE belongs comprises: the base station comparing the remaining S1 transmission bandwidth of the operator to which the UE belongs with the S1 transmission bandwidth expected to be needed by the to-be-accessed service requested by the UE, if the remaining S1 transmission bandwidth of the operator to which the UE belongs meets the to-be-accessed service, allowing the UE to access the service requested by the UE, if the remaining S1 transmission bandwidth of the operator to which the UE belongs cannot satisfy the to-be-accessed service, notifying the UE that the service establishment fails.

Preferably, the method also comprises: the base station obtaining the information of the operator to which the UE belongs from the core network side or from the UE side when the UE establishes a connection with the core network.

Preferably, the base station acquires the operator to which the UE belongs through a cell that indicates the information of the operator to which the UE belongs and is carried in an initialization context establishment request sent through the core network; alternatively, the base station acquires the operator to which the UE belongs through the cell that indicates the information of the operator to which the UE belongs and is carried in RRC establishment request message by the UE.

Preferably, the method also comprises: the base station obtaining the remaining S1 transmission bandwidth of the operator to which the UE belongs as follows: the base station periodically calculating and saving the remaining S1 transmission bandwidth of each operator according to the S1 transmission bandwidth subscribed by each operator and the S1 transmission bandwidth already occupied by each operator collected in real time in the base station; when the UE initiates a service, the base station obtaining the latest remaining S1 transmission bandwidth of the operator to which the UE belongs by querying; alternatively, when the UE initiates a service, the base station calculating in real time the remaining S1 transmission bandwidth of the operator to which the UE belongs according to the S1 transmission bandwidth subscribed by the operator to which the UE belongs and the S1 transmission bandwidth already occupied by the operator collected in real time.

To solve the aforementioned technical problem, the present invention also provides a resource control device, comprising a collection module, a calculation module and a processing module, wherein:

said collection module is set to collect in real time the S1 transmission bandwidth occupied by one or more operators in the base station;

said calculation module is set to calculate the remaining S1 transmission bandwidth of each operator according to the S1 transmission bandwidth subscribed by one or more operators and the S1 transmission bandwidth already occupied by one or more operators collected by the collection module;

said processing module is set to determine whether the UE is allowed to access the service or not according to the remaining S1 transmission bandwidth of the operator to which the UE belongs when the user equipment (UE) initiates a service request.

Preferably, said processing module is also set to obtain the information of the operator to which the UE belongs from the core network side or the UE side when the UE establishes a connection with the core network.

Preferably, said device also comprises an acceptance module and a rejection module; said processing module is set to determine whether the UE is allowed to access the service or not as follows: when the UE initiates a service request, compare the remaining S1 transmission bandwidth of the operator to which the UE belongs with the S1 transmission bandwidth expected to be needed by the to-be-accessed service and requested by the UE, determine whether the remaining S1 transmission bandwidth of the operator to which the UE belongs meets the to-be-accessed service or not, if yes, trigger said acceptance module, otherwise, trigger said rejection module; said acceptance module is set to complete the UE service access; said rejection module is set to return service establishment failed message to the UE.

Preferably, the calculation module is set to calculate the remaining S1 transmission bandwidth of each operator as follows: periodically calculate and report the remaining S1 transmission bandwidth of each operator to said processing module; or calculate the remaining S1 transmission bandwidth of each operator based on the request of said processing module, and report it to said processing module; said processing module is also set to request the remaining S1 transmission bandwidth of the operator to which the UE belongs from said calculation module when the UE initiates a service request.

To solve the aforementioned technical problem, the present invention also provides a base station, and the base station comprises said resource control device.

By collecting in real time the S1 transmission bandwidth resource occupied by the operator in the system, the method and device of the present invention can achieve the resource control, guarantee each operator's profit, and avoid the case that the quality of service of the users of other operators is damaged or cannot be accepted because a certain operator occupies excessive S1 transmission resource, thus ensuring the user experience and improving the user satisfaction at the same time.

PREFERRED EMBODIMENTS OF THE PRESENT INVENTION

Figure 1:
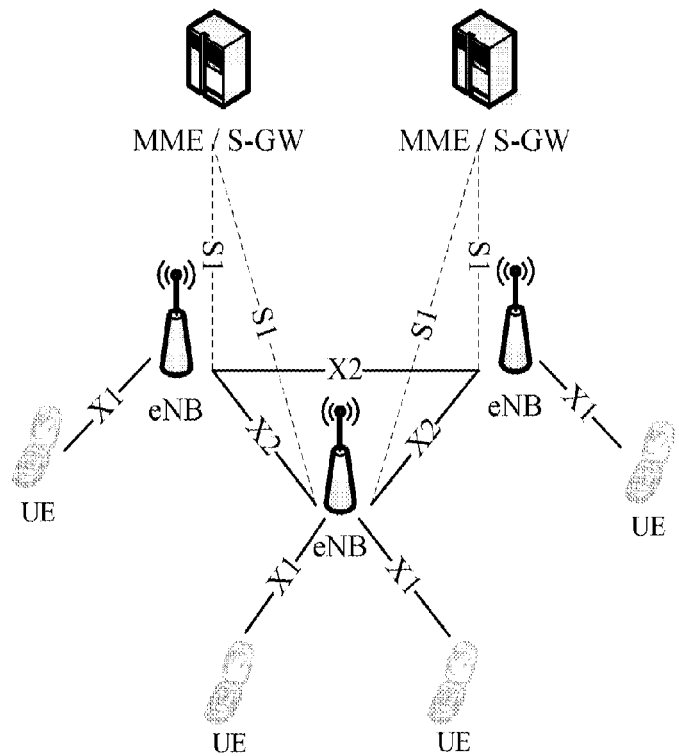
FIG. 1 is a schematic diagram of the existing LTE mobile communication system.

The inventive concept of the present invention is: the base station collects in real time the S1 transmission bandwidth occupied by one or more operators in the base station; when the user equipment (UE) initiates a service request, the base station determines whether the UE is allowed to access the service or not according to the remaining S1 transmission bandwidth of the operator to which the UE belongs.

The step of the base station collecting in real time the S1 transmission bandwidth occupied by one or more operators therein comprises: the base station collecting in real time the S1 transmission bandwidth occupied by each operator according to the ongoing services of one or more operators therein. When a UE accesses to a new service, or exits a service, or the quality of service changes, it will cause the S1 transmission bandwidth occupied by the operator to which the UE belongs to change, the base station to which the UE belongs collects and updates in real time the S1 transmission bandwidth occupied by one or more operators which achieve the services through the local base station.

Said step of the base station determining whether the UE is allowed to access the service or not according to the remaining S1 transmission bandwidth of the operator to which the UE belongs comprises: the base station comparing the remaining S1 transmission bandwidth of the operator to which the UE belongs with the S1 transmission bandwidth expected to be needed by the to-be-accessed service: if the remaining S1 transmission bandwidth of the operator can meet said service access, the UE is allowed to access the service request by the UE, otherwise, the service establishment fails.

The operator to which the UE belongs is acquired by the base station when the UE establishes a connection to the core network. The base station can obtain the information of the operator to which the UE belongs from the core network side or the UE side, for example, the operator to which the UE belongs is acquired through the cell indicating the information of the operator to which the UE belongs and carried in the initialization context establishment request sent by the core network; alternatively, in the process of the UE establishing a radio resource control (RRC) connection with the base station, the UE notifies the base station of the information of the operator to which the UE belongs through the cell indicating the information of the operator to which the UE belongs and carried in the RRC establishment request message.

The remaining S1 transmission bandwidth of the operator to which the UE belongs is obtained through one of the following ways:

the base station periodically calculating and saving the remaining S1 transmission bandwidth of each operator according to the S1 transmission bandwidth subscribed by each operator in the base station and the S1 transmission bandwidth already occupied by each operator collected in real time; when the UE initiates a service, the base station obtaining the latest remaining S1 transmission bandwidth of the operator to which the UE belongs by querying;

when the UE initiates a service, the base station calculating in real time the remaining S1 transmission bandwidth of the operator according to the S1 transmission bandwidth subscribed by the operator and the S1 transmission bandwidth already occupied by the operator collected in real time.

The base station might estimate the S1 transmission bandwidth expected to be needed by the to-be-accessed service according to the type of the service initiated by the UE, or estimate the S1 transmission bandwidth expected to be needed by the to-be-accessed service according to the type of the service initiated by the UE and the QoS (quality of service).

The aforementioned S1 transmission bandwidth subscribed by the operator means the size of the S1 transmission bandwidth pre-leased by the operator from the base station.

The aforementioned S1 transmission bandwidth subscribed by the operator means: the summation of the S1 transmission bandwidth occupied by the services used by users of the operators in the subscribed base station.

The aforementioned S1 transmission bandwidth of the aforementioned operator means: the remaining S1 transmission bandwidth obtained by the S1 transmission bandwidth subscribed by the operator minus the S1 transmission bandwidth occupied by the operator.

Figure 2:
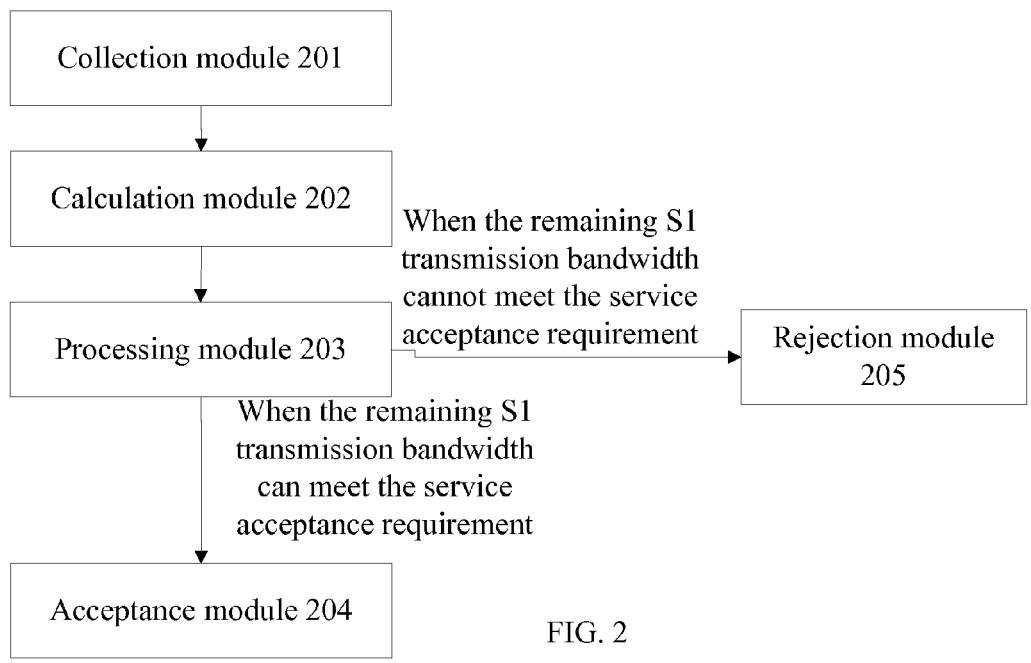
FIG. 2 is a structure diagram of the device in the present invention.

As shown in FIG. 2, the resource control device achieving the aforementioned method comprises a collection module 201, a calculation module 202 and a processing module 203, wherein:

said collection module 201 is configured to collect in real time the S1 transmission bandwidth occupied by one or more operators in the base station;

said calculation module 202 is configured to calculate the S1 transmission bandwidth of each operator according to the S1 transmission bandwidth subscribed by one or more operators and the S1 transmission bandwidth already occupied by one or more operators collected by the collection module;

said processing module 203 is configured to determine whether the UE is allowed to access the service or not according to the remaining S1 transmission bandwidth of the operator to which the UE belongs when the user equipment (UE) initiates a service request.

The aforementioned device is preferably configured in the base station, but it might be configured separately. The modules in the device can be integrated or configured separately, for example, the calculation module 202 and the processing module 203 can be integrated.

Preferably, said processing module 203 is also configured to obtain the information of the operator to which the UE belongs from the core network side or the UE side when the UE establishes a connection with the core network.

As shown in FIG. 2, said device also comprises an acceptance module 204 and a rejection module 205;

said processing module 203 is configured to determine whether the UE is allowed to access the service or not as follows: when the UE initiates a service request, compare the remaining S1 transmission bandwidth of the operator to which the UE belongs with the S1 transmission bandwidth that is expected to be needed by the to-be-accessed service, determine whether the remaining S1 transmission bandwidth of the operator to which the UE belongs meets the to-be-accessed service or not, if yes, trigger said acceptance module, otherwise, trigger said rejection module;

said acceptance module 204 is configured to complete the UE service access;

said rejection module 205 is configured to return service establishment failed message to the UE.

Preferably, the calculation module 202 periodically calculates the remaining S1 transmission bandwidth of each operator, and reports it to the processing module.

Preferably, the processing module 203 is also configured to request the remaining S1 transmission bandwidth of the operator to which the UE belongs from the calculation module when the UE initiates a service request; said calculation module 202 calculates the remaining S1 transmission bandwidth of each operator based on the request of the processing module 203 and reports it to the processing module 203.

The present invention will be further illustrated in detail in the following with combination of the accompanying drawings and the embodiments.

The First Embodiment

Figure 3:
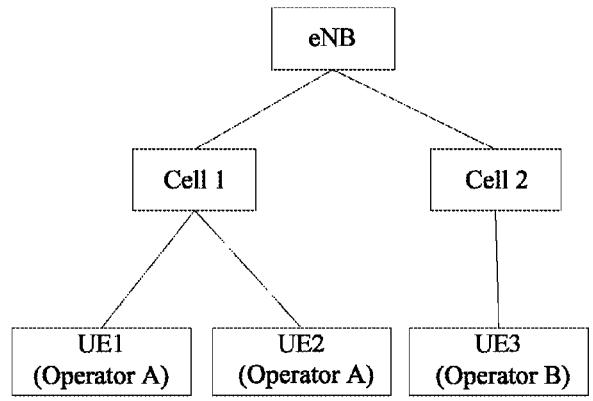
FIG. 3 is a schematic diagram of the scenario of a first embodiment of the present invention.

This embodiment describes the S1 transmission bandwidth collection and control when different operators occupy different cell resources in the same base station. As shown in FIG. 3, the operator A and the operator B respectively sign contracts with the eNB to lease the S1 transmission bandwidth. The current system has two cells: Cell1 and Cell2, the users in the Cell1 belong to the operator A, the users in the Cell2 belong to the operator B. The base station starts to collect in real time the transmission bandwidth after the subscribed S1 transmission bandwidth becomes available, and the operators A and B respectively collect the S1 transmission bandwidth.

At this time, the Cell1 has the UE1 of the operator A, and the Cell2 has the UE3 of the operator B.

Step one: the UE2 establishes a connection with the core network, and the base station detects that the operator to which the UE2 belongs is the operator A;

Step two: the UE2 initiates a service, and the base station queries the currently remaining S1 transmission bandwidth of the operator A;

in this embodiment, the base station periodically calculates the available S1 transmission bandwidth of each operator, and queries when the user equipment initiates a service. In other embodiments, the base station might calculate in real time.

Step three: the base station compares the remaining S1 transmission bandwidth of the operator A with the S1 transmission bandwidth expected to be needed by the to-be-accessed service initiated by the UE2, if the remaining S1 transmission bandwidth of the operator A meets the new service access, the service access is allowed; otherwise, the service establishment fails.

The base station collects and updates in real time the S1 bandwidth collection results of the operators A and B, for example, when the service on the UE2 is released, the base station updates in real time the remaining S1 transmission bandwidth of the operator A.

The Second Embodiment

Figure 4:
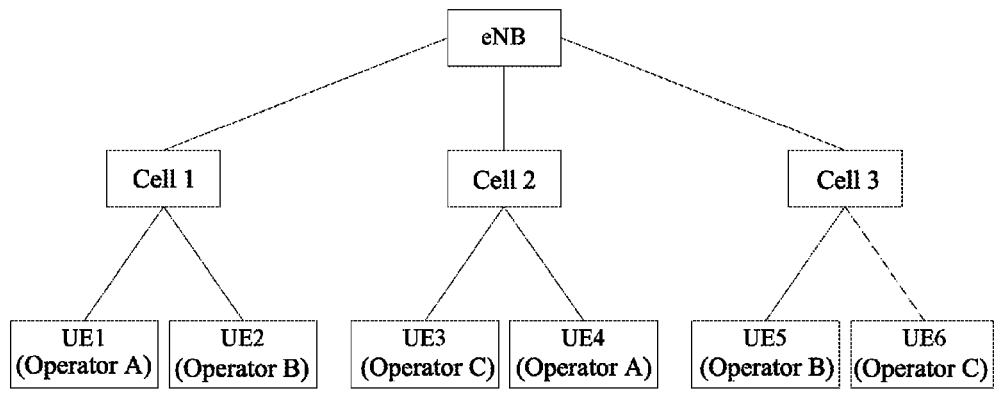
FIG. 4 is a schematic diagram of the scenario of a second embodiment of the present invention.

This embodiment describes the S1 transmission bandwidth collection and control when two operators share one cell resource. As shown in FIG. 4, the operators A, B and C respectively sign contracts with the eNB to lease the S1 transmission bandwidth. The current base station has three cells: Cell1, Cell2 and Cell3, wherein, the Cell1 is shared by the operators A and B, the Cell2 is shared by the operators A and C, and the Cell3 is shared by the operators B and C. The base station starts to collect in real time the transmission bandwidth after the subscribed S1 transmission bandwidth becomes available, and the operators A, B and C respectively collect the S1 transmission bandwidth.

At this time, the Cell1 has the UE1 and the UE2, and the Cell2 has the UE3 and the UE4, the Cell3 has the UE5, wherein, the UE1 and the UE4 belong to the operator A, the UE2 and the UE5 belong to the operator B, and the UE3 belongs to the operator C.

Step one: the UE6 establishes a connection with the core network, and the base station detects that the operator to which the UE6 belongs is the operator A;

Step two: the UE6 initiates a service, and the base station calculates that the currently remaining S1 transmission bandwidth of the operator C;

in this embodiment, the base station calculates in real time the remaining S1 transmission bandwidth according to the S1 transmission bandwidth subscribed by the operator and the occupied S1 transmission bandwidth.

Step three: the base station compares the remaining S1 transmission bandwidth of the operator C with the S1 transmission bandwidth expected to be needed by the to-be-accessed service initiated by the UE6: if the remaining S1 port bandwidth of the operator C meets the new service access, the service access is allowed; otherwise, the service establishment fails.

The base station collects and updates in real time the S1 transmission bandwidth collection results of the operators A, B and C, for example, when the service on the UE6 is released, the base station will update in real time the remaining S1 transmission bandwidth of the operator C.

The person of ordinary skill in the art can understand that all or part of the steps in the aforementioned method can be completed by a program instructing the related hardware, and the program can be stored in a computer readable storage medium, such as a read-only memory, disk, or CD-ROM. Optionally, all or part of the steps in the aforementioned embodiments can also be achieved with one or more integrated circuits, and accordingly, each module in the aforementioned embodiments can be implemented in the form of hardware or software functional modules. The present invention is not limited to any particular form of hardware and software combination.

Of course, the present invention also have other embodiments, and without departing from the spirit and essence of the present invention, a person of the ordinary skill in the art can make various corresponding changes and modifications according to the present invention, and these changes and modifications should belong to the protection scope of the claims appended in the present invention.

INDUSTRIAL APPLICABILITY

Compared with the related art, by collecting in real time the S1 transmission bandwidth resource occupied by the operator in the system, the present invention can achieve the resource control, guarantee each operator's profit, and avoid the case that the quality of service of the users of other operators is damaged or cannot be accepted because a certain operator occupies excessive S1 transmission resource, thus ensuring the user experience and improving the user satisfaction at the same time.

What is claimed is:

1. A resource control method, applied in a scenario where more than one operator shares a same base station, comprising:
   collecting, by the base station, in real time an S1 transmission bandwidth occupied by the more than one operator sharing the base station;
   obtaining, by the base station, information of an operator to which a user equipment, UE, belongs from a core network side or from the UE side when the UE establishes a connection with the core network; and
   when the UE initiates a service request, determining, by the base station, whether the UE is allowed to access the service or not according to a remaining S1 transmission bandwidth of the operator to which the UE belongs;
   wherein the step of determining, by the base station, whether the UE is allowed to access the service or not according to the remaining S1 transmission bandwidth of the operator to which the UE belongs comprises:
   comparing, by the base station, the remaining S1 transmission bandwidth of the operator to which the UE belongs with S1 transmission bandwidth expected to be needed by the to-be-accessed service requested by the UE, if the remaining S1 transmission bandwidth of the operator to which the UE belongs meets the to-be-accessed service, allowing the UE to access the service requested by the UE, if the remaining S1 transmission bandwidth of the operator to which the UE belongs cannot satisfy the to-be-accessed service, notifying the UE that service establishment fails;
   wherein the remaining S1 transmission bandwidth of the operator to which the UE belongs means: the remaining S1 transmission bandwidth obtained by the S1 transmission bandwidth subscribed by the operator to which the UE belongs minus the S1 transmission bandwidth occupied by the operator to which the UE belongs, wherein the S1 transmission bandwidth occupied by the operator to which the UE belongs means the summation of the S1 transmission bandwidth occupied by the services used by UEs of the operators in a subscribed base station.

2. The method of claim 1, wherein,
   the step of collecting, by the base station, in real time the S1 transmission bandwidth occupied by the more than one operator in the base station comprises: collecting, by the base station, in real time the S1 transmission bandwidth occupied by each operator according to ongoing services of the more than one operator sharing the base station.

3. The method of claim 1, wherein,
   the step of obtaining, by the base station, information of the operator to which the UE belongs from a core network side or from the UE side when the UE establishes a connection with the core network comprises:
   acquiring, by the base station, the operator to which the UE belongs through a cell that indicates the information of the operator to which the UE belongs and is carried in an initialization context establishment request sent through the core network; alternatively, acquiring, by the base station, the operator to which the UE belongs through a cell that indicates the information of the operator to which the UE belongs and is carried in RRC establishment request message by the UE.

4. The method of claim 1, further comprising:
   obtaining, by the base station, the remaining S1 transmission bandwidth of the operator to which the UE belongs by:
   periodically calculating and saving, by the base station, the remaining S1 transmission bandwidth of each operator according to the S1 transmission bandwidth subscribed by the more than one operator and the S1 transmission bandwidth already occupied by the more than one operator collected in real time; when the UE initiates a service, obtaining, by the base station, a latest remaining S1 transmission bandwidth of the operator to which the UE belongs by querying; or
   when the UE initiates a service, calculating, by the base station, in real time the remaining S1 transmission bandwidth of the operator to which the UE belongs according to the S1 transmission bandwidth subscribed by the operator to which the UE belongs and the S1 transmission bandwidth already occupied by the operator collected in real time.

5. A resource control device, applied in a scenario where more than one operator shares a same base station, comprising at least one processor executing a collection module, a calculation module, a processing module, an acceptance module and a rejection module, wherein:
   said collection module is configured to collect in real time an S1 transmission bandwidth occupied by the more than one operator sharing the base station;
   said calculation module is configured to calculate a remaining S1 transmission bandwidth of each operator according to the S1 transmission bandwidth subscribed by the more than one operator and the S1 transmission bandwidth already occupied by the more than one operator collected by the collection module;
   said processing module is configured to obtain information of an operator to which a user equipment, UE, belongs from a core network side or the UE side when the UE establishes a connection with the core network;
   said processing module is also configured to determine whether the UE is allowed to access the service or not according to the remaining S1 transmission bandwidth of the operator to which the UE belongs when the UE initiates a service request;
   said processing module is configured to determine whether the UE is allowed to access the service or not by a following way: when the UE initiates a service request, compare the remaining S1 transmission bandwidth of the operator to which the UE belongs with the S1 transmission bandwidth expected to be needed by the to-be-accessed service and is requested by the UE, determine whether the remaining S1 transmission bandwidth of the operator to which the UE belongs meets the to-be-accessed service or not, if yes, trigger said acceptance module, otherwise, trigger said rejection module; wherein the remaining S1 transmission bandwidth of the operator to which the UE belongs means: the remaining S1 transmission bandwidth obtained by the S1 transmission bandwidth subscribed by the operator to which the UE belongs minus the S1 transmission bandwidth occupied by the operator to which the UE belongs, wherein the S1 transmission bandwidth occupied by the operator to which the UE belongs means the summation of the S1 transmission bandwidth occupied by the services used by UEs of the operators in a subscribed base station;

said acceptance module is configured to complete the UE service access;

said rejection module is configured to return service establishment failed message to the UE.

6. The device of claim 5, wherein, the calculation module is configured to calculate the remaining S1 transmission bandwidth of each operator by:

periodically calculating and reporting the remaining S1 transmission bandwidth of each operator to said processing module; or calculating the remaining S1 transmission bandwidth of each operator based on a request of said processing module, and reporting the remaining S1 transmission bandwidth of each operator to said processing module;

said processing module is also configured to request the remaining S1 transmission bandwidth of the operator to which the UE belongs from said calculation module when the UE initiates a service request.

7. A base station, wherein, the base station comprises the resource control device of claim 5.

* * * * *